Figure 1:
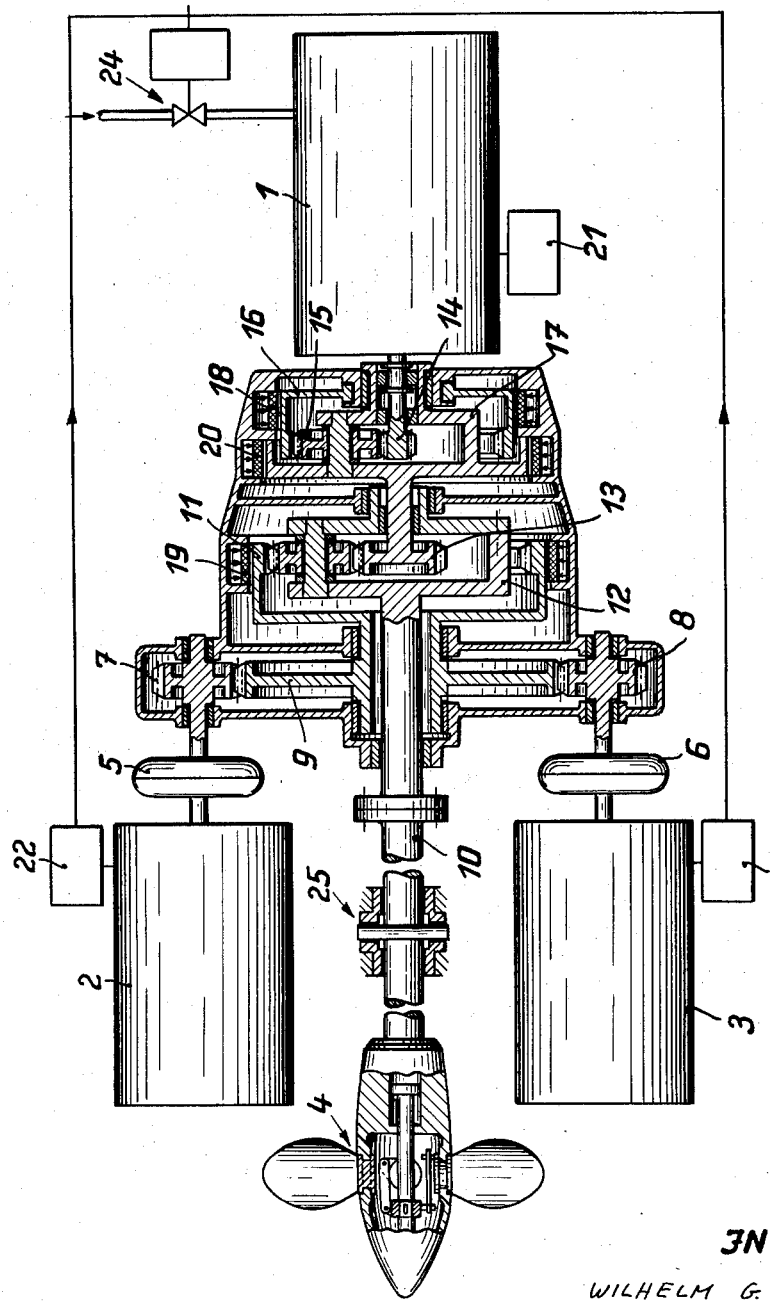

Aug. 25, 1964     W. G. STOECKICHT     3,145,779
MULTI-ENGINE MAIN PROPULSION GEARING ARRANGEMENTS
Filed June 18, 1962     2 Sheets-Sheet 1

INVENTOR:
WILHELM G. STOECKICHT

BY:
Harness, Dickey & Pierce
ATTORNEYS

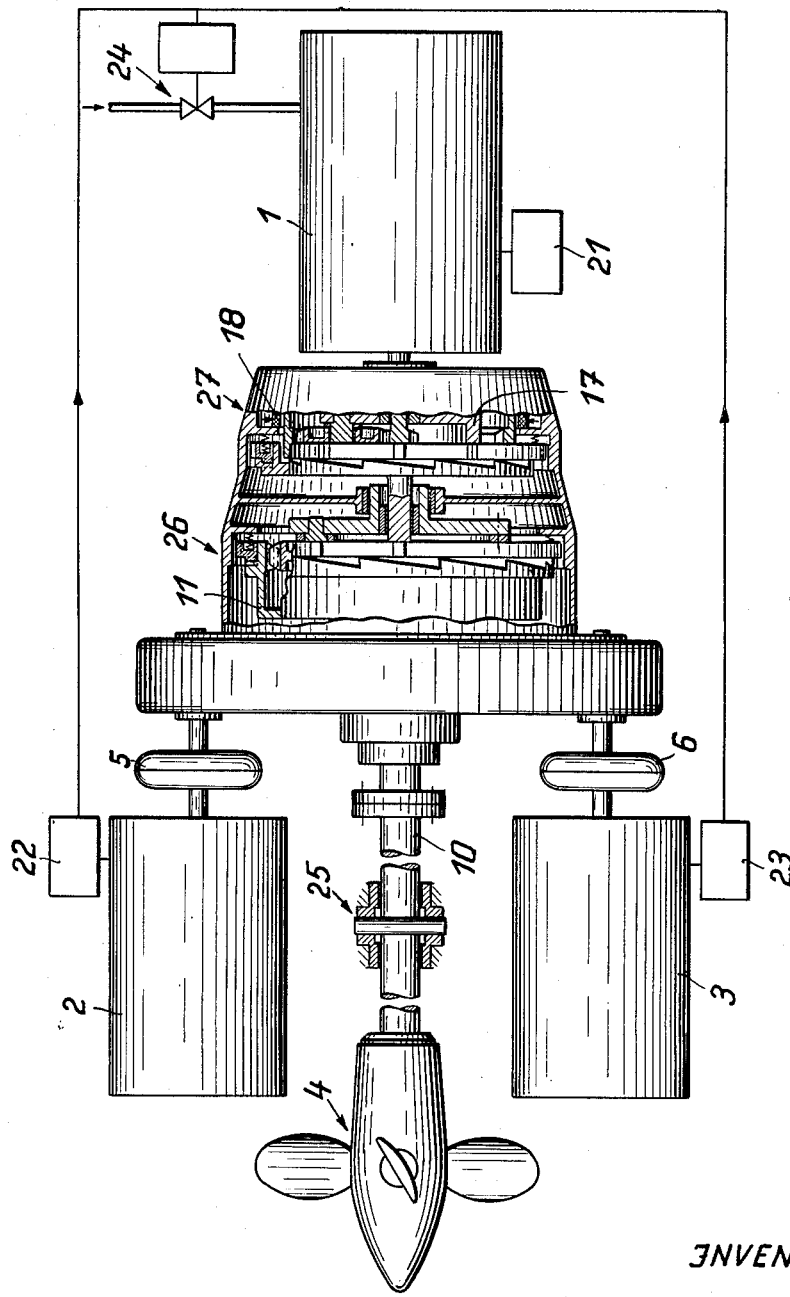

United States Patent Office 3,145,779
Patented Aug. 25, 1964

3,145,779
MULTI-ENGINE MAIN PROPULSION GEARING
ARRANGEMENTS
Wilhelm G. Stoeckicht, 4 Rugendasstrasse,
Munich-Solln, Germany
Filed June 18, 1962, Ser. No. 203,043
Claims priority, application Germany July 12, 1961
4 Claims. (Cl. 170—135.75)

The invention relates to gearing combinations for ships in which several driving engines are effective on one propeller shaft, in particular to combinations of the type in which the driving engines may be clutched in or out. The effective combination of the output of these driving engines on to one propeller shaft is accomplished by means of combining gears which are generally designed in the manner of so-called parallel-shaft gearing, that means gears having parallel axes. The invention relates to a gearing arrangement for a ship of the described type having planetary gearing wherein always one driving engine is effective on one concentric gear member, while the planet carrier is coupled with the propeller shaft. In such an arrangement it is possible that either both driving engines are transmitting their output to the propeller shaft or selectively only one thereof; in the latter case the other concentric gear which does not participate in the drive will have to be held stationary by means of a brake.

It is possible for such arrangements to include parallel shaft gearing as well as those embodying planetary gears. In variable multispeed transmissions, mostly transmissions having two ratios are employed which allow for an adaptation of the speed of the propeller to the optimum for its power intake. This is equally possible when the propeller has been designed in the manner of a so-called variable pitch propeller. For it has been found that a variable pitch propeller, the optimum relations of which are designed for a driving condition at full output load of the driving engines, may readily be adjusted to effect a drive partial load i.e. one of the driving engines being clutched out. In this case the drive is then performed with a smaller angle of pitch of the propeller blades. But this drive at smaller pitch angles is connected with the drawback that substantially lower efficiences result; in order to avoid this, the described driving arrangements may be equipped with variable pitch propellers having change speed gearing with two ratios. Such installations eliminate the drawback of the poor efficiency when effecting drive with less than full power but they necessitate in turn a more expensive construction.

The invention is directed to the problem of providing a gearing arrangement for a ship having several driving engines, mostly two, which may be clutched in or out wherein on the one hand the fitting of multispeed transmissions may be dispensed with and on the other hand good propeller efficiences may nevertheless be obtained. In accordance with the invention, this is effected by the combination of a planetary combining gear which is designed in such a manner that when declutching a driving engine, the number of revolutions of the propeller shaft is decreased in proportion with the power which is then still supplied thereto, with a variable pitch propeller the optimum design of which is in turn intended for the upper range of working speeds. Further suitable embodiments of the invention will be seen from the attached drawings showing diagrammatically two embodiments of the invention by way of example.

In the drawings: FIGURE 1 is a diagrammatic top view partly in section showing an embodiment of the marine propulsion unit according to the invention; and FIGURE 2 is a similar view of another embodiment in accordance with the invention.

In accordance with FIG. 1, a high speed engine 1 which is mostly designed in the form of a gas or steam turbine, supplies the power effective on the ship's propeller 4 in combination with two more driving engines 2 and 3 which in this example are designed in the form of Diesel engines. The two Diesel engines 2 and 3 are respectively driving the pinions 7 and 8 of a combining gear through respective couplings 5 and 6 which are declutchable, the combining gear having its accumulating gear 9 arranged coaxially with respect to the propeller shaft 10. The couplings 5 and 6 are preferably designed in a known per se manner as liquid couplings. The accumulating gear 9 is solidly connected with the ring gear 11 of a planetary accumulator gearing, the planet gear carrier 12 of which is in turn solidly connected with the propeller shaft 10. The central gear 13 of the planetary accumulator gearing is connected with the high speed driving engine 1 through a reduction gear which in the case of the embodiment shown by way of example is formed by a planetary gearing. In this arrangement, the driving engine 1 is driving the central gear 14 in a manner known per se which rotates the planetary gears 15 which are in turn meshing with the freely rotatably supported ring gear 16 lockable against rotation by a brake 18, and thereby rotating the planet gear carrier 17. The latter is solidly connected with the central gear 13 of the planetary accumulator gearing. In addition it is, of course, recommendable to provide for declutching of the driving engine 1 which is suitably effected by said brake 18 so that the rotatably supported ring gear 16 may be retained or released. The ring gear 11 and the central gear 13 are adapted to be locked against rotation by respective brakes 19 and 20 actuated by pressure fluid. FIG. 2 shows an embodiment differing from the one shown in FIG. 1 only in that the brakes 19, 20 are replaced by ratchet gears 26 and 27 cooperating with pawls allowing rotation of the ring gear 11 of the accumulator gearing or the planet gear carrier 17 of the reduction gearing only in one direction in which they are acting as brakes. The propeller 4 is of the well known variable pitch propeller type constructed to perform the optimum efficiency preferably at maximum speed and full load operation at which the output of all the driving engines 1, 2 and 3 is acting on the propeller. The propeller thrust is taken up by the thrust bearing 25.

The driving engines 1, 2 and 3 are provided with governors 21, 22 and 23 which are designed as speed governors, the governors 22 and 23 acting through a flow control 24 on the fuel, or steam supply respectively, of the driving engine 1 in such a way that with a decrease in the speed of the engines 2 or 3 below the present number of revolutions, the fuel, or the steam supply respectively, of the engine 1 will be throttled. The mode of operation of the embodiment shall now be explained in connection with one example. In this the values are given by way of example in order to better illustrate the conditions, and it is to be understood that these values are not to be considered in a restrictive sense. For the outputs and speeds the following random values are assumed:

Driving engine 1: nominal output 10,000 H.P. with r.p.m.=4800
Driving engine 2: nominal output 5,000 H.P. with r.p.m.=800
Driving engine 3: nominal output 5,000 H.P. with r.p.m.=800

The propeller speed for operation with the above three nominal outputs of the three driving engines is assumed to be 300 r.p.m. The propeller 4 is to give its optimum performance at this speed and this output or approximately at these relationships. The ratio of the number of teeth of the ring gear 11 of the planetary accumulating gearing with respect to the central gear 13 is to be 3:1. The ratio between the pinions 7 or 8, respectively, and the accumulating gear 9 is to be 4:1. The ratio in the planetary reduction gearing 14, 15, 16 of the driving engine 1 is to be 8:1.

If the propulsion unit is operating with the engines 2 and 3, only the engine 1 will be at rest, or ineffective respectively, by releasing the brake 18 and the central gear 13 of the planetary accumulating gearing is kept stationary by means of the brake 20. The planetary accumulating gearing 18 is then effective via the gears 7, 8, 9 as a reduction gearing for the driving engines 2 and 3, the speed of which will then be reduced from 800 r.p.m. to 200 r.p.m. of the accumulating gear 9 at the above mentioned ratio of 4:1 with tooth number ratios in the planetary gear as indicated, this gear assembly has a ratio of 1.333:1. In the operational condition now prevailing namely with the ring gear 11 driving and the central gear held stationary the ratio between the ring gear 11 and the planet gear carrier 12 will be 1.33:1 therefore the propeller shaft is driven at a speed of 150 r.p.m. But it is also possible to stop both engines 2 and 3, or disengage them and drive the propeller shaft 10 of the ship, or the variable pitch propeller 4 respectively, only by means of the engine 1. The speed of this engine of 4800 r.p.m. is reduced by the planetary reduction gearing 14, 15, 16 at a ratio of 8:1 to assume the value of 600 r.p.m.; thus the engine is now driving the central gear 13 of the planetary accumulator gearing at this number of revolutions, with the holding brakes 18 and 20 being released and the holding brake 19 being applied, which not only brakes the accumulating gear 9 but also the ring gear 11 of the planetary accumulating gearing.

The latter now operates as a planetary reduction gear with a driving central gear 13 and a stationary ring gear 11. With a tooth number ratio of these two concentric gears as indicated above the planetary accumulator gearing in the now prevailing operating condition has a ratio 4:1; the propeller shaft 10 is therefore driven by the engine 1 at a speed of 150 r.p.m. Now, if all the engines that means the driving engines 1, 2 and 3 are simultaneously driving the propeller shaft, both the retaining brakes 19 and 20 will be released and brake 18 applied; the rotational movements transferred onto the propeller shaft 10 are adding and are superimposing each other in a known per se manner in the planetary accumulator gearing; the propeller speed will then be 300 r.p.m.

As explained above, a substantial feature of the invention is to be seen in the fact that the variable pitch propeller has an optimum design intended for the transfer of the total output of the drive aggregate, that means for a number of revolutions lying in the upper speed range, preferably for an operating speed at full output. If the aggregate is now run with partial power only, in this case either with the output of the engine 1 or the group of engines 2, 3, then the speed of the propeller shaft and thus that of the propeller will drop to 150 r.p.m. which is a lower speed than that one which would correspond to the propeller speed for the corresponding power intake (assuming a constant position of the blades), because the torque intake of the propeller with constant position of the blades, is about proportional to the square of the speed. The further drop in speed must then be balanced by a greater pitch of the propeller blades.

This will bring about a change of the degree of efficiency of the propeller to the worse which is, however, compensated at least to a considerable extent by the fact that the new step of the operation takes place at a substantially lower speed range so that the decrease of efficiency of the propeller remains within acceptable limits.

Another condition of operation which is possible in the embodiment given by way of example, consists in the operation of the aggregate with only one Diesel engine, for instance the engine 3, wherein coupling 5 of the engine 2 will then be released. In this case, the propeller shaft 10 and thus the propeller 4 are driven at the same speed, i.e. 150 r.p.m., because the ratios in the gears remain the same, but only with half the output, i.e. 5000 H.P. But this means that the just mentioned greater pitch of the propeller blades is no longer necessary resulting in the very favourable fact that just for this operating condition with a lower power input an especially favourable exploitation of the variable pitch propeller is given by the advantages of the invention.

An essential feature of the planetary accumulator gearing of the type described consists in that the torque ratio of the central gear 13 and the ring gear 11 is always a constant value, which is inherent to the construction. It is therefore necessary that with a simultaneous drive by all the engines 1, 2 and 3, the latter will have to be provided with speed controls 21, 22, 23. Now if the engine 1 is a turbine in accordance with the embodiment described by way of example, and the engines 2 and 3 are Diesel engines, the torque curve of which plotted against speed is generally flatter than that of the turbines, it will be recommendable to influence the steam or fuel supply, respectively, to the turbine additionally by the speed controls 22, 23 of the one or other Diesel engine via a flow control 24, so that no stall of the Diesel engines can take place. This is achieved in such a manner that upon a drop in speed of one of the Diesel engines 2 or 3 that can no longer be controlled by its speed control, the fuel or steam supply, respectively, of the turbine engine 1 is throttled. This is particularly important whenever the turbine is starting to operate in addition to the Diesel engines which are already in operation.

This additional influence which is effected on the speed control of the engine 1 by the speed controls of the engines 2 and 3, in many cases, may suitably be provided in such a manner that the influence is a reciprocal one, that means that also the speed control of the engine 1 influences the other engines 2 and 3.

It is emphasized that the outputs and speeds mentioned in the embodiment given by way of example are random values and the effect of the invention is by no means restricted to these ratios.

What I claim is:

1. A marine propulsion unit comprising in combination a first and second driving engine; a planetary gearing driven either in unison or selectively by either one of said driving engines; a variable pitch propeller mounted on a shaft driven by said planetary gearing; said planetary gearing comprising a first central gear mounted on the drive shaft of said first driving engine, first planet gears meshing with said first central gear and a first ring gear the latter being lockable against rotation by first brake means, a first planet gear carrier carrying said first planet gears and being lockable against rotation by second brake means, a second central gear coaxially aligned with said first central gear and rigidly connected to said first planet gear carrier, second planet gears meshing with said second central gear and a second ring gear the latter being lockable against rotation by third brake means and rigidly connected to a third central gear coaxially aligned with said first and said second central gears and driven via releasable coupling means by said second driving engine, said planetary gearing forming a two step reduction gearing, in which in a selective first gear train said first and said second driving motors are connected at high speed to said propeller shaft by engaging said first brake means and said coupling means of said second driving engine and releasing said second and said third brake means, in which in a selective second gear train said first driving engine only is connected at low speed to said propeller shaft by engaging said first brake means and said third brake means and releasing said coupling means of said second drive motor, and in which in a selective third gear train said second driving engine only is connected at low speed to said propeller shaft by engaging said coupling means of said second driving engine and said second brake means and releasing said first and said third brake means, said variable pitch propeller including actuating means for adjusting the pitch of the propeller blades.

2. A marine propulsion unit as claimed in claim 1, in which in addition to said first and said second driving engine a third driving engine is provided, said third driving engine being drivably connected via second releasable coupling means with said third central gear in parallel relation to said second driving engine whereby said selective third gear train may include both or either one of said second and said third driving engines.

3. A marine propulsion unit as claimed in claim 1, in which said brake means are formed by ratchet gears effective only in one direction of rotation.

4. A marine propulsion unit as claimed in claim 2, in which said coupling means are formed by hydrostatic couplings.

References Cited in the file of this patent

UNITED STATES PATENTS 2,860,713     Peterson _____ Nov. 18, 1958

FOREIGN PATENTS 64,392     Austria _____ Apr. 10, 1914